United States Patent [19]

Popov et al.

[11] 3,974,070
[45] Aug. 10, 1976

[54] PROCESS FOR PURIFYING TAP WATER

[76] Inventors: Igor Vasilievich Popov, ulitsa Bljukhera, 59, kv. 41; Gely Romanovich Bochkarev, Krasny prospekt, 56, kv. 26; Vitaly Fedorovich Lebedev, ulitsa Kamenskaya, 88, kv. 8; Feaor Anisimovich Baryshnikov, ulitsa Derzhavina, 19, kv. 10, all of Novosibirsk, U.S.S.R.

[22] Filed: Jan. 20, 1975

[21] Appl. No.: 542,265

Related U.S. Application Data

[63] Continuation of Ser. No. 433,700, Jan. 16, 1974, abandoned, which is a continuation of Ser. No. 259,815, June 5, 1972, abandoned.

[52] U.S. Cl. ................................. 210/47; 210/75
[51] Int. Cl.² ...................................... B01D 37/02
[58] Field of Search .............. 204/11, 9, 152, 96; 210/50, 42, 47, 44, 75, 73, 290, 45, 49, 24, 27, 28

[56] References Cited
UNITED STATES PATENTS

| | | | |
|---|---|---|---|
| 2,658,033 | 11/1953 | Ferris | 204/152 |
| 2,832,473 | 4/1958 | Oberholtzer | 210/47 |
| 3,171,802 | 3/1965 | Rice et al. | 210/290 |
| 3,523,891 | 8/1970 | Mehl | 210/47 |
| 3,557,961 | 1/1971 | Stuart | 210/290 |

OTHER PUBLICATIONS

Betz, Handbook of Industrial Water Conditioning, Betz Laboratories Inc., 5th Ed., p. 8.
Food Additives Ion Exchange Resins; Amer. Fed. Register, 29, 9708 (July 18, 1964) Chem. Abstr. 1964: 9953g.

*Primary Examiner*—Charles N. Hart
*Assistant Examiner*—Benoit Castel
*Attorney, Agent, or Firm*—Holman & Stern

[57] ABSTRACT

A process for purifying tap water which comprises filtering water containing impurities flocculated by a metal hydroxide produced electrolytically, through a layer of a solid water-insoluble granular material. On said layer, in the direction of water flow, a layer of a metal hydroxide is deposited through which the water to be purified is passed. The water thus purified is substantially free from impurities and may be useful in the electronics, medical, food and other industries.

10 Claims, 1 Drawing Figure

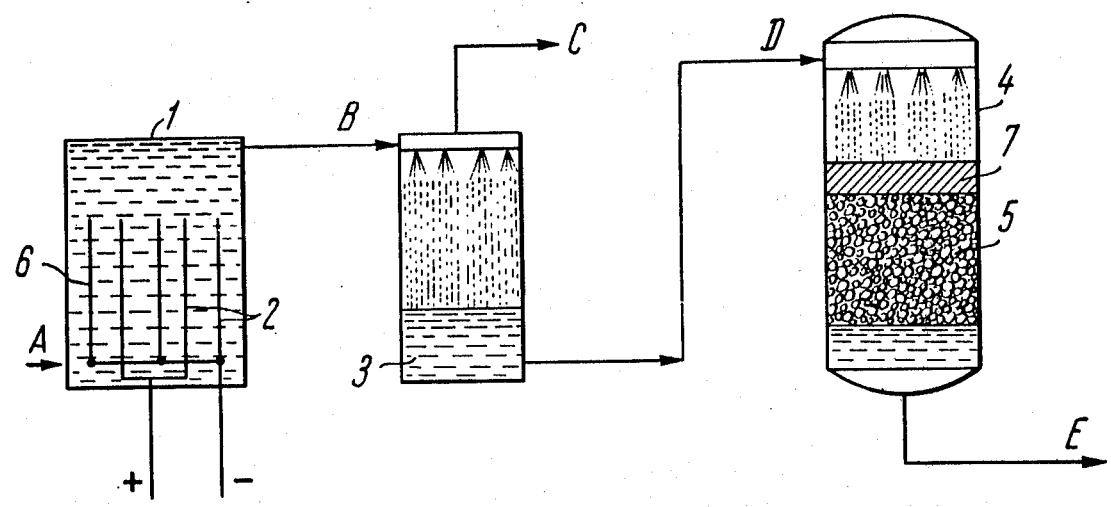

PROCESS FOR PURIFYING TAP WATER

This is a continuation of application Ser. No. 433,700 filed Jan. 16, 1974 which in turn is a continuation of Ser. No. 259,815, filed June 5, 1972, both now abandoned.

The present invention relates to processes for the purification of tap water which is used in the electronic, medical, and food industries.

It is generally known that in the production of pure water free from mechanical, chemical, and bacteriological contaminants use is made of complicated purification processes including expensive operations of coagulation with electrolytes, ionite installations and mechanical filters.

The main disadvantage of these processes of water purification resides in that they do not provide for complete purification of water from fine disperse mechanical impurities comprising, mainly, particles of hydromica and calcite. The presence of these particles in water such as used for washing components in electronics greatly impairs the quality of the final products.

Known in the art are processes for treating purifying waste and natural (from water basins) waters by a method of electrolytical coagulation. Thus, in U.S. Pat. No. 3,523,891 there is a disclosure of a two-stage system for treating waste waters comprising a first-stage electrolyzer adapted for producing flocs of a metal hydroxide, and an apparatus for producing ozone and the passing thereof through the electrolyzer, this ozone being a carrier and a disinfecting agent at the same time. The second stage of water purification is similar to the first one and is intended for the final purification of water. According to this water treatment technology a metal hydroxide resulting from the electrolysis adsorbs, directly in the electrolyzer bath, suspended solid impurities in the form of flocs and comes to the surface of the electrolyzer bath entrapped by ozone bubbles, thus forming a foam layer. The latter is removed by means of a vacuum pump.

Known in the art is another process for treating natural water from water basins (see, for example, German (FRG) Pat. No. 1,274,042) comprising passing water through an electrolyzer provided with aluminium electrodes, wherein the resulting aluminium hydroxide $Al(OH)_3$ is a flocculating agent for various impurities contained in the water. From the electrolyzer the water is fed into a settling apparatus, wherein the aluminium hydroxide in the form of flocs with disperse particles deposited thereon settles by gravity onto the bottom of the settling apparatus, while the purified water is directed to further purification steps.

One may see that both above-described methods are intended for purifying waters containing substantial amounts of coarsely suspended impurities, the major portion of these impurities being removed with a metal hydroxide, while further treatment of said waters makes them suitable for drinking and various household applications.

These processes, however, are not applicable in the preparation of extra-purity water from potable tap water, since the flocculation with a metal hydroxide within the entire bulk of water (entire volume of an apparatus) cannot ensure the complete elimination of fine impurities. This is due to the fact that flocs of the metal hydroxide are suspended in water, i.e., isolated from each other, and the probability of their contact with fine disperse particles of impurities is, naturally, rather small.

For these reasons, it is a current practice in the electronic and medical industries to use water purified by a distillation method. This method of purifying water is inefficient and expensive, since for the distillation of 1 $m^3$ of water the energy consumption amounts to as much as 1,000 kW.hr.

It is an object of the present invention to overcome these disadvantages.

This invention is directed to a process for purifying tap water which will provide the best conditions for contacting a metal hydroxide as the most suitable flocculating agent with disperse particles contained in the water, thus making it possible to produce, at insignificant costs, an extra-purity water in required amounts.

This object has been accomplished in a process for purifying tap water comprising filtration of the water with impurities flocculated by a metal hydroxide produced electrolytically in the same water, through a layer of a solid water-insoluble granular material. The water containing a metal hydroxide is, according to the present invention, passed continuously through a layer of a solid water-insoluble granular material in such a manner that on the surface of the material said metal hydroxide is deposited, in the direction of water flow, in the form of an additional filtering layer through which the water being purified is passed.

The metal hydroxide is an active flocculating agent for the finest disperse particles and possesses a high water-penetrating ability, so that the use of a metal hydroxide in the form of a water-penetrating layer having a high adsorption activity makes it possible to efficiently perform a continuous process of water purification.

It is advantageous that the metal hydroxide layer be deposited on the surface of the solid granular material layer during the electrolysis.

It is also advantageous that the metal hydroxide layer be periodically deposited on the surface of the granular material layer, while periodically performing the electrolysis, whereby costs of water purification may be considerably reduced.

It is desirable to perform the electrolysis at a pH of 7.2 to 8.2, since with these pH values there is observed the maximum evolution of a metal hydroxide which is an active flocculating agent.

The electrolysis may be performed using additional electrodes (anodes) which are non-oxidizable to enable production, during the electrolysis, of additional amounts of oxygen which is known to be a catalyst for the reaction of oxidizing metal hydrosuboxide to hydroxide, thus providing an increase in the installation productivity.

It is advisable to pass the water being treated through the hydroxide and granular material layers at a speed not exceeding 3 m/hr. Greater speeds reduce the service life of the installation and lower the quality of water purification, since there occurs an active carrying-away of the metal hydroxide flocs from the upper layer, breaking of the hydroxide layer, and carrying-away of flocs through the granular material layer.

It is preferable to employ as the solid water-insoluble granular material, sulphocarbon, anthracite or a mixture thereof having particles of 0.25 to 3 mm in size, whereby the major part of the metal hydroxide may be deposited in a layer form on the surface of the granular material, thus providing additional contact of the water being treated with the metal hydroxide not only in the layer of hydroxide, but in the interporous space of the granular material as well, with the result that additional conditions for water clarifying are created.

The following is a detailed description of a specific embodiment of the present invention taken in conjunction with the accompanying drawing.

An installation for the purification of tap water comprises an electrolyzer 1 which is a vessel fed with tap water supplied in the direction shown by arrow A and provided with vertically mounted metal electrodes 2 (iron or aluminium). Such an electrolyzer may be of an open type and operated without an excessive pressure, although it may also be of a so-called closed type, i.e., operated under an excessive pressure.

It is preferable that iron electrodes be employed as the metal electrodes 2, while aluminium electrodes should be used in the case where the water being treated has an acidic pH=5-7 and a sufficiently high temperature within the range of from 25° to 45°C. With such parameters of the water, aluminium hydroxide $Al(OH)_3$ shows the lowest solubility. In all other cases the water under treatment will be enriched with aluminium ions, i.e. $Al^{+++}$ which should be eliminated by an additional treatment.

Practical experience shows, however, that tap water as well as water from natural sources has a neutral or slightly alkaline pH, so that there is no necessity in the employment of aluminium electrodes.

When the process is performed using an electrolyzer 1 operated under an excessive pressure, the water to be treated is delivered, in the direction shown by arrow B, to a degaser 3 connected to a filter 4 by means of a piping. In the filter 4 there is a layer 5 of a solid water-insoluble granular material having particles of 0.25 to 3 mm in size. As such granular material use is made of sulphocarbon, anthracite or a mixture thereof.

The process of water purification on such installation may be performed as follows:

Tap water is fed into the electrolyzer 1. Electrodes 2 are, at the same time, connected to a source of direct-current voltage. In doing so, an iron anode is dissolved with the formation of ferrous hydroxide $Fe(OH)_2$ and a small amount of ferric hydroxide $Fe(OH)_3$, and the evolution of oxygen and hydrogen. Further, the ferrous hydroxide is transformed into ferric hydroxide; the former is known to coagulate at pH values within the range of 9 to 9.5 (hydrogen ions concentration in the solution), while ferric hydroxide coagulates at lower pH values. For this reason, to ensure normal coagulation, it is necessary to oxidize the ferrous hydroxide to ferric hydroxide $Fe(OH)_3$. This is accomplished by oxidizing the ferrous hydroxide $Fe(OH)_2$ with oxygen dissolved in the water and formed during the electrolysis on the anode plates and additional anodes 6 which are non-oxidizable provided in the electrolyzer 1. However, the oxidation of ferric hydroxide by oxygen dissolved in the water occurs at pH values of at least 7. With insufficient pH values or a shortage of oxygen, iron may go into the filtrate in the form of $Fe^{+++}$ ions.

It has been experimentally shown that the lowest amount of iron in the filtrate is obtained in the case where the starting water is treated at a pH within the range of from 7.2 to 8.2.

During the formation of ferric hydroxide there occurs oxidation of some impurities, contained in the water, by the oxygen and intermixing of the water with the hydroxide, whereby a partial adsorption of fine disperse and colloid impurities is observed on the surface of the ferric hydroxide flocs.

The water to be treated together with the ferric hydroxide $Fe(OH)_3$ is directed to the degaser 3, wherein excess oxygen and hydrogen are eliminated from the solution and evacuated in the direction shown by arrow C. Further mixing of the water with the flocculating agent, viz. ferric hydroxide, and adsorption of impurities contained in the water take place in this stage.

From the degaser 3, the mixture of water and adsorbed particles is fed, in the direction shown by arrow D, to the filter 4 onto the layer 5 of solid water-insoluble granular material, the layer having a height of 1 to 2 m.

The ferric hydroxide is deposited from the solution on the layer 5 of granular material, whereby an additional filtering layer 7 is formed consisting of ferric hydroxide flocs, and the water is filtered first through the layer of ferric hydroxide 7 and then through the layer 5 of granular material. Thus there occurs complete intensive adsorption of impurities within the layer 7 of ferric hydroxide and within the layer 5 of granular material. The purified water is evacuated in the direction shown by arrow E.

The water to be treated should be passed through said layers 5 and 7 at a speed of not more than 3 m/hr., since the speed of filtration and water supply is limited by the mechanical strength of the ferric hydroxide flocs and forces of interaction between the material of the granular layer 5 of the filter and the ferric hydroxide flocs.

At a filtration speed of more than 3 m/hr the flocs passing through the layer 7 are broken and ferric hydroxide passes into the filtrate.

During the operation of the installation, the electrolyzer 1 may function under various conditions:

a. continuously under a constant current load (current strength in the electrolyzer is maintained constant during the operation of the installation);

b. continuously under a variable current load (current strength in the initial stage is temporarily increased in order to reduce the duration of forming the hydroxide layer 7 on the granular layer 5); and c. intermittently (after the ferric hydroxide layer formation, the electrolyzer electrodes are set under tension periodically, e.g. 2 hours of operation, 6 hours of pause).

Tests have shown that impurities contained in water in the form of variously dispersed particles from coarse to colloidal size are completely separated from the water. Water turbidity prior to and after the purification is controlled by means of a nephelometer. The following water turbidity data was thus obtained: prior to the purification water turbidity index was 0.096; after the purification it was 0.000.

Optimal conditions for ferric hydroxide formation are shown in Table 1 below.

Table 1

| Current strength, A | Voltage, V | Power, W | Anode working surface, $m^2$ | Current density, $A/m^2$ | pH | Non-oxidizable anode surface area, $m^2$ |
|---|---|---|---|---|---|---|
| 170 | 28 | 4.76 | 2.8 | 64 | 7.4 | 63 |

It is advisable to combine electrocoagulation treatment of water with subsequent final purification thereof on an ionite installation.

Table 2 shows the results obtained for water purification according to the scheme: electrocoagulation - ionite treatment.

Table 2

| Object to be treated | Dry residue, mg/l | Iron content, mg/l | Oxidation ability, mg/l | Optical density (by nephelometer) | Conductivity, $\times 10^{-5}$, $ohm^{-1} \times cm^{-1}$ |
|---|---|---|---|---|---|
| Tap water | 180–240 | 0.48 | 3.44–5.50 | 0.034–0.080 | |
| Tap water after ionite treatment | 10–15 | 0.013 | 1.5–2.5 | 0.03–0.04 | 0.6 |
| Water after electrocoagulation and ionite treatment | 1–4 | 0.012 | 0.8–1.2 | 0.000 | 0.3 |

Table 3 shows the results obtained for water purification according to the scheme: electrocoagulation - filtration.

Table 3

| Object to be treated | Dry residue, mg/l | Water hardness, mge/l | Iron content, mg/l | Oxidation ability, mg/l | Optical density by nephelometer |
|---|---|---|---|---|---|
| Tap water | 180–240 | 1.88–1.93 | 0.48–0.50 | 3.44–5.50 | 0.034–0.080 |
| Water after electrocoagulation and filtration | 54–78 | 0.50–0.52 | 0.16–0.32 | 1.1–2.0 | 0.000 |

The process according to the present invention is simple to perform and does not require special expensive equipment.

We claim:

1. A process for purifying tap water consisting of the steps of: adsorbing finely dispersed impurities contained in the water being treated by a flocculating agent consisting of ferric hydroxide, the ferric hydroxide being produced electrolytically with at least one iron anode, said water having a pH of from 7.2 to 8.2, and said ferric hydroxide being deposited as a layer on a layer of a solid water-insoluble granular material having a grain size of from 0.25 to 3 mm and selected from the group consisting of sulphocarbon, anthracite and mixtures thereof; and filtering the water through the layer of ferric hydroxide and the layer of solid water-insoluble granular material at a speed of not more than 3 m/hr.

2. The process as claimed in claim 1, wherein the electrolysis is performed using additional anodes which are non-oxidizable.

3. The process as claimed in claim 1, wherein the solid water-insoluble granular material consists of sulphocarbon.

4. The process as claimed in claim 1, wherein the solid water-insoluble granular material consists of anthracite.

5. The process as claimed in claim 1, wherein the solid water-insoluble granular material consists of a mixture of anthracite and sulphocarbon.

6. A process for purifying tap water consisting of the steps of: adsorbing finely dispersed impurities contained in the water being treated by a flocculating agent consisting of aluminium hydroxide, the aluminium hydroxide being produced electrolytically with at least one aluminium anode, said water having a pH of from 5 to 7, and said aluminium hydroxide being deposited as a layer on a layer of a solid, water-insoluble granular material having a grain size of from 0.25 to 3 mm and selected from the group consisting of sulphocarbon, anthracite and mixtures thereof; and filtering the water through the layer of aluminium hydroxide and the layer of solid water-insoluble granular material at a speed of not more than 3 m/hr.

7. The process as claimed in claim 6, wherein the electrolysis is performed using additional anodes which are non-oxidizable.

8. The process as claimed in claim 6, wherein the solid water-insoluble granular material consists of sulphocarbon.

9. The process as claimed in claim 6, wherein the solid water-insoluble granular material consists of anthracite.

10. The process as claimed in claim 6, wherein the solid water-insoluble granular material consists of a mixture of anthracite and sulphocarbon.

* * * * *